Jan. 15, 1935.   L. G. RILEY   1,987,709
CONTROL APPARATUS
Filed Nov. 29, 1933   3 Sheets-Sheet 2

INVENTOR
Lynn G. Riley.

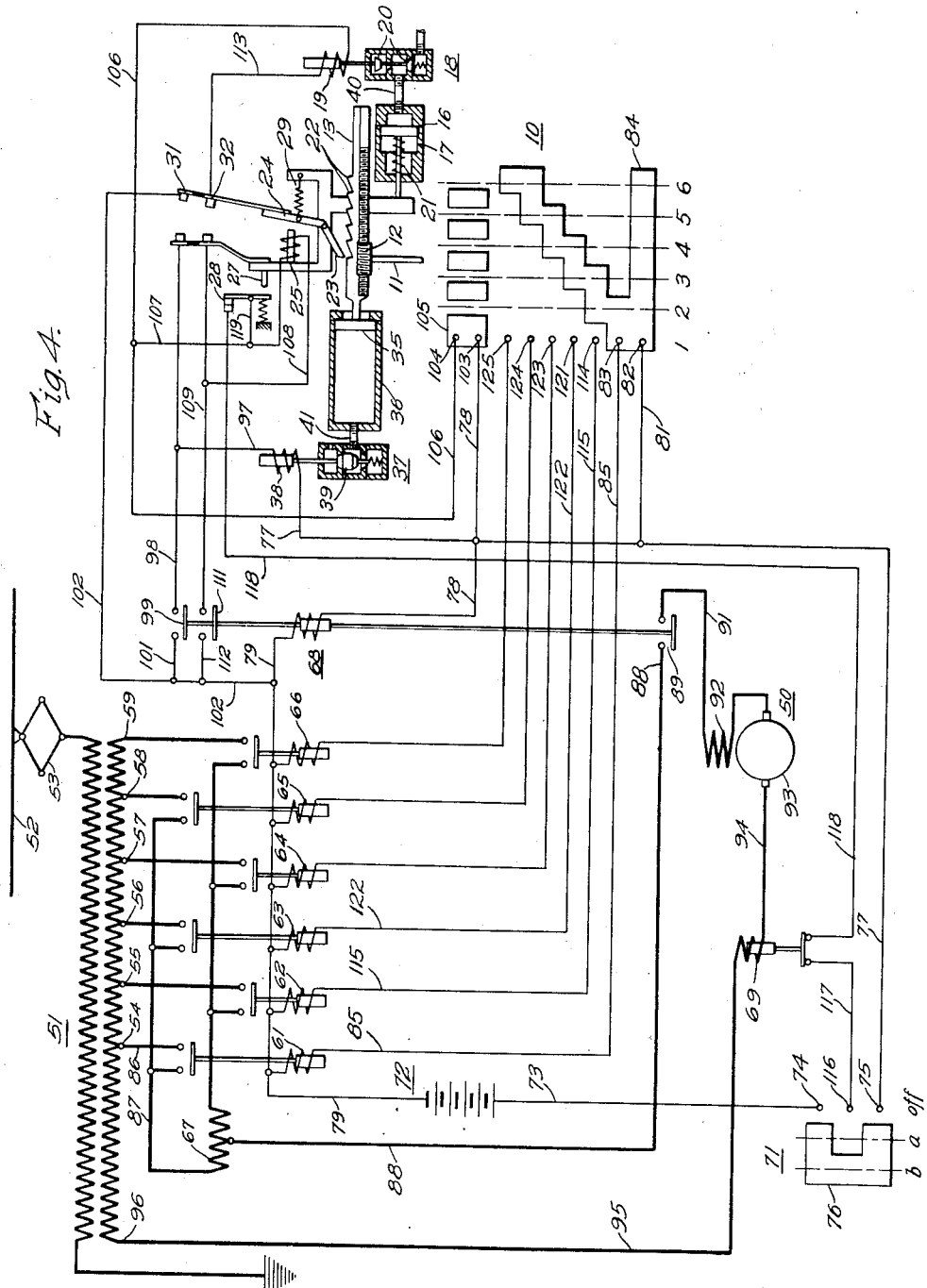

Patented Jan. 15, 1935

1,987,709

UNITED STATES PATENT OFFICE 1,987,709

CONTROL APPARATUS

Lynn G. Riley, Pittsburgh, Pa., assignor to Westinghouse Electric & Manufacturing Company, East Pittsburgh, Pa., a corporation of Pennsylvania Application November 29, 1933, Serial No. 700,330

12 Claims. (Cl. 200—17)

My invention relates, generally, to control apparatus, and, more particularly, to apparatus for controlling the operation of the propelling motors of electric vehicles.

Controllers of the drum type, commonly known as sequence switches, are usually utilized for remotely controlling the switching apparatus required for the operation of railway motors and heretofore the sequence switches have been driven by air engines in which a balanced air pressure is relied upon for effecting a step-by-step movement of the controller drum. While this method has been satisfactory for most applications, it is not satisfactory for controlling the operation of multiple-unit trains wherein it is necessary that the accelerating switches on all cars be operated in synchronism.

An object of my invention, generally stated is to provide an actuating mechanism for controllers of the drum type which shall be simple and efficient in operation and which may be economically manufactured and installed.

A more specific object of my invention is to provide an actuating mechanism for controllers of the drum type which shall produce a positive step-by-step movement of the controller drum.

A further object of my invention is to provide an electrically controlled, fluid-actuated, operating mechanism for moving a controller drum step-by-step in one direction and for moving the controller drum rapidly and continuously in the opposite direction.

Other objects of my invention will be either explained fully hereinafter or will be apparent to those skilled in the art.

According to the present invention, I provide a positive acting magnetic and mechanical device for notching the controller drum in a step-by-step manner. A fluid-actuated piston produces a movement of one notch for each stroke of the piston and repeats its movement for each successive notch. Electrically-operated magnet valves control the admission of the pressure fluid to the operating cylinders.

For a fuller understanding of the nature and scope of my invention, reference may be had to the following detailed description, taken in conjunction with the accompanying drawings, in which:

Fig. 4 is a diagrammatic view of a system of electric motor control embodying my invention.

Figure 1:
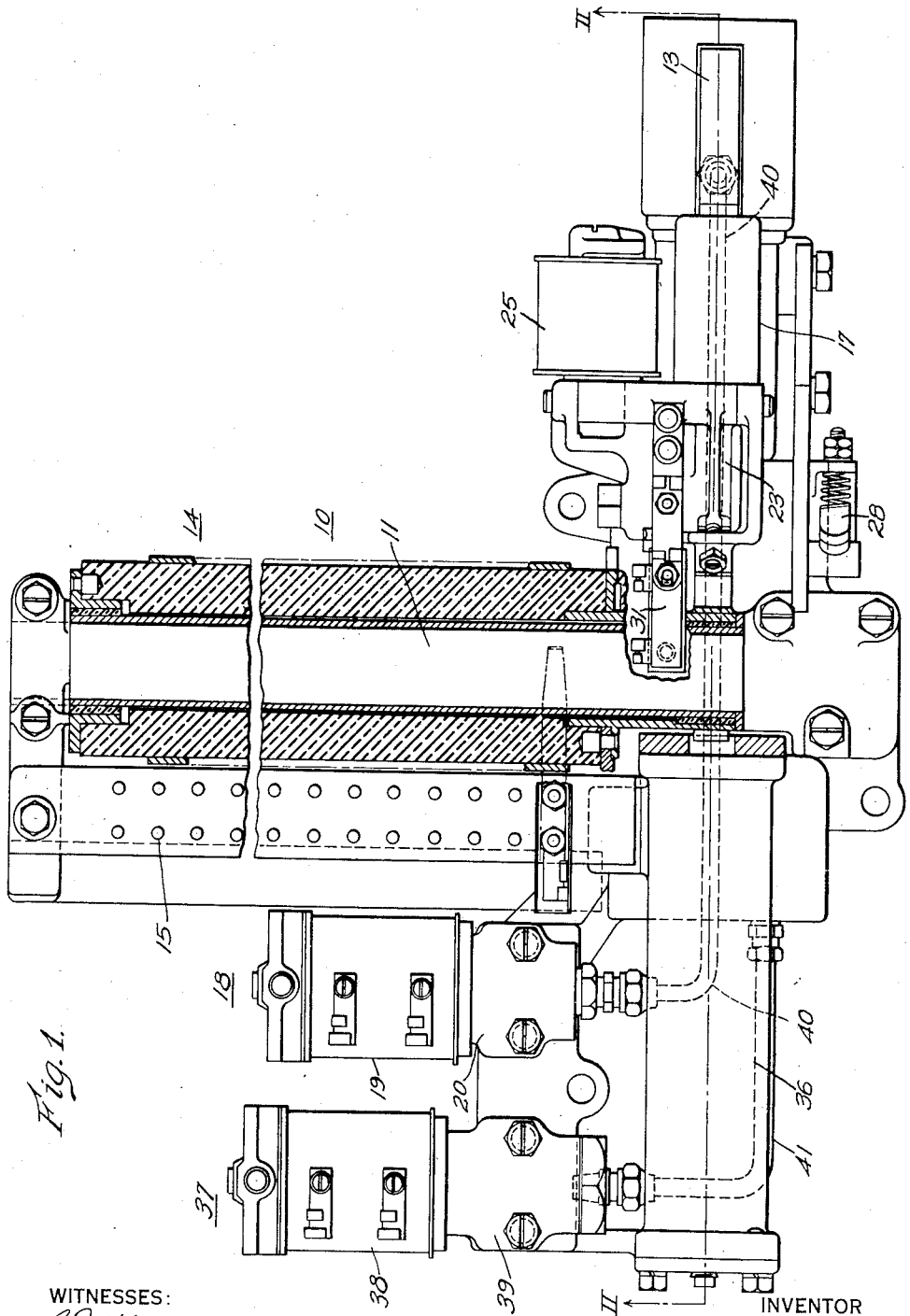
Figure 1 is a view, partially in plan and partially in section, of a drum-actuating mechanism constructed in accordance with my invention.
Figure 2:
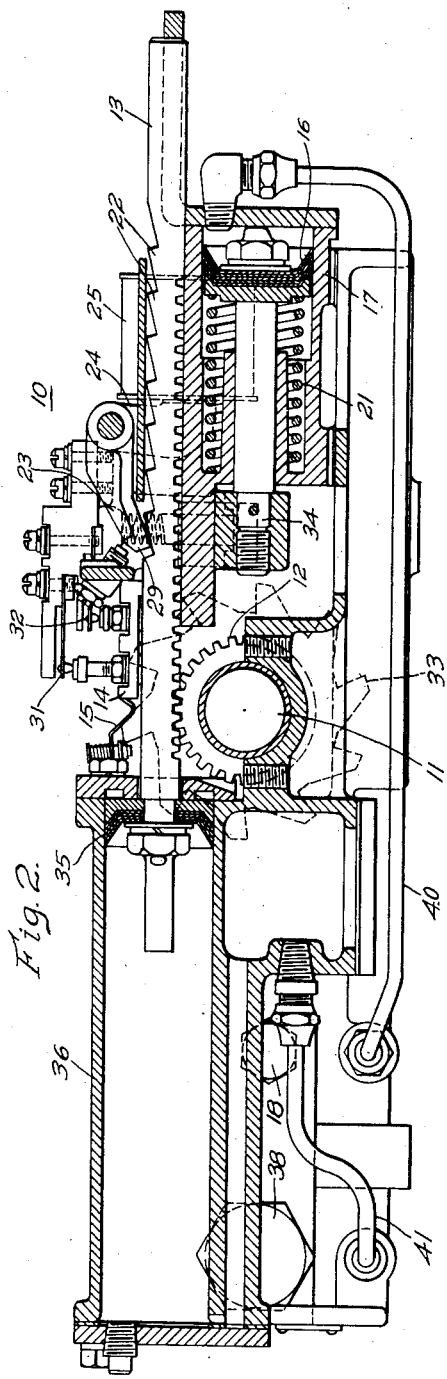
Fig. 2 is a sectional view, taken along the line II—II of Fig. 1.

Referring to the drawings, and particularly to Figs. 1 and 2, the apparatus shown comprises a controller drum 10, the shaft 11 of which is rotated by a gear 12, driven by a rack 13. The drum 10 is provided with contact segments 14 which are engaged by contact fingers 15, as the drum is rotated, to control the operation of switching apparatus in the usual manner.

In order to produce a positive step-by-step movement of the drum 10 an actuating mechanism is provided for notching the rack 13 which comprises a fluid-actuated piston 16, disposed inside of a cylinder 17. Any suitable operating medium, such as compressed air, oil, water or gas, may be utilized for actuating the piston 16, compressed air being preferable for railway service.

As shown in Figs. 1 and 4, the operation of the piston 16 is controlled by an electro-magnetically actuated valve 18, of a well known type, comprising an actuating coil 19 and a valve member 20 which controls the admission and the exhaustion of the pressure fluid to and from the cylinder 17. When the pressure fluid is admitted to the cylinder the piston is actuated to compress a spring 21, disposed inside of the cylinder 17. When the pressure fluid is released from the cylinder the spring 21 returns the piston to the position shown in the drawings.

As shown in Fig. 2, a plurality of teeth or notches 22 are provided on one side of the rack 13. A pawl 23, which is actuated by a pivotal armature 24 of an electromagnet 25, is disposed to engage the teeth 22 when the pawl is actuated to its lowermost position. The magnet 25, its armature 24 and the pawl 23 are all carried by the piston 16 as shown in Fig. 4 and are, therefore, actuated back and forth as the piston 16 operates in the cylinder. It will thus be seen that the rack 13, and consequently the drum 10, may be actuated step-by-step, by causing the pawl 23 to engage the rack 13 and then admitting the pressure fluid to the cylinder 17 to operate the piston 16.

Figure 3:
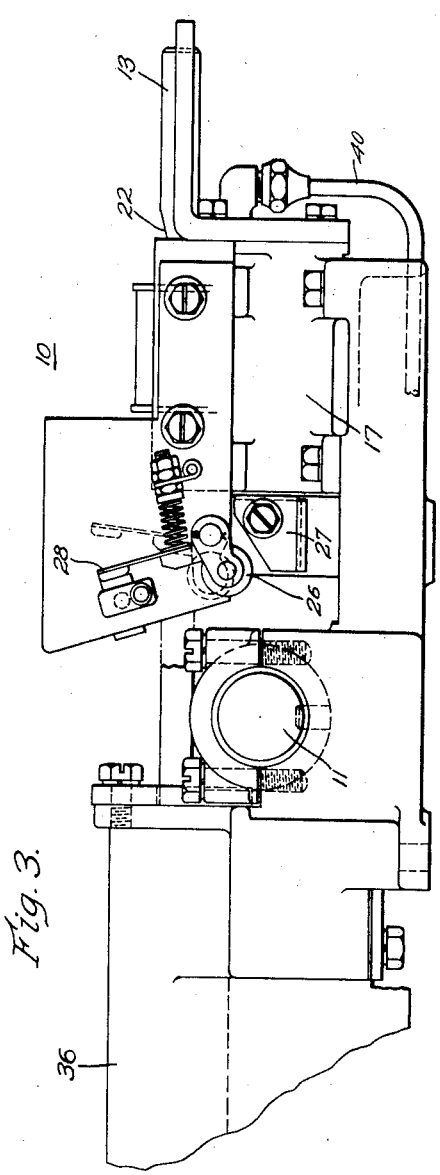
Fig. 3 is a view, in side elevation of a portion of the mechanism shown in Fig. 1.

In order to cause the magnet 25, which actuates the pawl 23, to be deenergized and also to permit the pressure fluid to be released from the cylinder 17, a roller 26, as shown in Fig. 3, is disposed to be engaged by a cam 27 when the piston 16 completes each stroke. A contact member 28 is actuated when the cam 27 engages the roller 26, thereby interrupting the circuits through the magnet 25 and the actuating coil 19 of the magnet valve 18, as well be explained more fully hereinafter. When the magnet 25 is deenergized a spring 29 causes the pawl 23 to disengage the rack 13 and also causes contact members 31 and 32, which are carried by the armature 24, to be opened.

In this manner the rack 13 is actuated one notch for each stroke of the piston, thereby rotating the drum 10 in a step-by-step manner. In order to prevent the drum 10 from overtravelling as the piston completes each stroke, a stop-wheel 33 is secured to the shaft 11 of the drum 10. The stop-wheel is provided with a plurality of teeth which are so spaced that one of the teeth is engaged by a finger 34 as the piston reaches the end of its stroke, thereby insuring that the drum will not overtravel.

In order to quickly return the rack 13 and the drum 10 to the position shown in the drawings after its has been notched in a step-by-step manner to any desired position, one end of the rack 13 is secured to a piston 35 which is disposed in a fluid-pressure cylinder 36. The operation of the piston 35 is controlled by a magnet valve 37, having an actuating coil 38 and a valve member 39. When the pressure fluid is admitted to the cylinder 36, the rack 13 is quickly and continuously actuated to the position shown in the drawings. Conducting pipes 40 and 41 are provided for conducting the pressure fluid from the magnet valves 18 and 37 to the cylinders 17 and 36, respectively.

The operation of the apparatus herein described may be better understood by referring to Fig. 4 of the drawings which is a diagrammatic view of a control system utilizing apparatus embodying the present invention to control the acceleration of a motor 50. The motor 50 may be of a type suitable for propelling an electric vehicle, (not shown). Power for operating the motor 50 is supplied from a transformer 51 which is energized from a power conductor 52 through a pantograph collector 53.

In accordance with the usual practice in alternating-current railway systems, the motor 50 may be accelerated by increasing the voltage applied to the motor in successive steps by successively connecting the motor to taps 54 to 59, inclusive, provided on the secondary winding of the transformer 51. A plurality of accelerating switches 61 to 66, inclusive, are provided for connecting the motor to the transformer taps. A preventive coil 67 is provided for preventing the short circuiting of the transformer winding during the switching operations, in a manner well known in the art.

A line switch 68 is provided for connecting the motor 50 to the power source and a limit relay 69 is utilized for governing the amount of current permitted to flow through the motor windings during acceleration, as will be more fully described hereinafter.

The operation of the accelerating switches 61 to 66, inclusive, is controlled by the sequence drum 10 which is operated by the notching mechanism herein described. A master controller 71 is provided for controlling the operation of the line switch 68 and also the sequence switch actuating mechanism, as will be more fully described hereinafter. A battery 72 provides energy for operating the control apparatus utilized in the system.

Assuming that it is desired to connect the motor 50 to the power source, the master controller 71 may be actuated to position $a$, thereby energizing the actuating coil of the line switch 68 through a circuit which extends from the positive terminal of the battery 72 through conductor 73, contact fingers 74 and 75 bridged by the contact segment 76, conductors 77 and 78, the actuating coil of the switch 68 and conductor 79 to the negative terminal of the battery 72.

When the controller 71 is actuated to position $a$, a circuit is also established for the actuating coil of the accelerating switch 61. This circuit may be traced from the previously energized conductor 77 through conductor 81, contact fingers 82 and 83 bridged by the contact segment 84, conductor 85, the actuating coil of the switch 61 and conductor 79 to the negative terminal of the battery 72.

The motor 50 is thereby connected to the secondary winding of the transformer 51, by means of a circuit extending from the tap 54 through conductor 86, the contact members of the switch 61, conductor 87, a portion of the preventive coil 67, conductor 88, the contact members 89 of the switch 68, conductor 91, the field winding 92 and the armature winding 93 of the motor 50, conductor 94, the actuating coil of the limit relay 69 and conductor 95 to the terminal 96 of the transformer 51.

It will be seen that the actuating coil of the magnet valve 37 is also energized when the master controller 71 is actuated to the position $a$, thereby operating the magnet valve 37 to a position which will permit the sequence drum 10 to be advanced. The energizing circuit for the coil 38 of the magnet valve 37 extends from the energized conductor 77 through the coil 38, conductors 97 and 98, an interlock 99 on the line switch 68, conductors 101, 102 and 79 to the negative terminal of the battery 72.

At this time the notching mechanism for the sequence drum 10 is actuated one step to close the accelerating switch 62. This operation is performed through the combined operation of the trigger magnet 25 and the magnet valve 18. The energizing circuit for the magnet 25 may be traced from the previously energized conductor 77 through conductor 78, contact fingers 103 and 104 bridged by the contact segment 105 on the sequence drum 10, conductors 106 and 107, the coil of the magnet 25, conductors 108 and 109, an interlock 111 on the switch 68, and conductors 112, 102 and 79 to the negative terminal of the battery 72.

When the magnet 25 is energized, its armature 24 is actuated to cause the pawl 23 to engage the rack 13, as described hereinbefore. The operation of the armature 24 also causes the interlock 32, which is carried by the armature 24, to establish a circuit to energize the actuating coil of the magnet valve 18. This circuit may be traced from the previously energized conductor 106 through the coil 19 of the magnet valve 18, conductor 113, the interlock 32, conductor 109 and the interlock 111 to the battery 72 through the circuit previously traced.

When the magnet valve 18 is energized, the pressure fluid is admitted to the cylinder 17 to operate the piston 16 and the rack 13, thereby advancing the sequence drum 10 one step to close the switch 62 which connects the preventive coil 67 to the tap 55 of the transformer 51. The energizing circuit for the actuating coil 62 extends from a contact finger 114 which engages the contact segment 84 through conductor 115, the actuating coil of the switch 62 and conductor 79 to the negative terminal of the battery 72.

If it is desired to accelerate the motor 50, the master controller 71 may be actuated to position b, thereby reenergizing the trigger magnet 25 through a circuit which may be traced from a contact finger 116, which engages the contact segment 76, through conductor 117, the contact members of the limit relay 69, conductor 118, the contact members 28, conductors 119 and 107, the magnet 25, conductors 108 and 109 and the interlock 111 to the negative terminal of the battery 72 through the circuit previously traced. When the magnet 25 is energized, the pawl 23 again engages the rack 13, also the coil 19 of the magnet valve 18 to energize, thereby causing the piston 16 to advance the sequence drum to position 3 in the manner previously described.

As described hereinbefore, the cam 27 actuates the contact member 28 to interrupt the circuit through the trigger magnet 25 when the piston 16 completes its stroke, thereby releasing the pawl 23 from the rack 13 and deenergizing the magnet valve 18 to permit the spring 21 to actuate the piston 16 and the notching mechanism to the position shown in the drawings.

When the sequence drum 10 is advanced to position 3 the switch 63 is operated to connect the preventive coil 67 to the tap 56. The energizing circuit for the switch 63 may be traced from the contact finger 121, which engages the contact segment 84, through conductor 122, the actuating coil of the switch 63 and conductor 79 to the negative terminal of the battery 72.

The sequence drum 10 is advanced in a step-by-step manner under the control of the limit relay 69 through positions 4, 5 and 6, thereby operating the accelerating switches 64, 65 and 66 by energizing the contact fingers 123, 124 and 125, respectively. When the voltage on the motor is raised, the motor current increases, thereby causing the limit relay 69 to operate to deenergize the notching mechanism for the sequence drum, however, the motor current decreases as the motor accelerates in speed and the contact members of the limit relay are closed to permit another step of acceleration to be taken in the manner herein described.

The notching mechanism herein described also functions to prevent more than one step of acceleration from being taken at a time, since the energizing circuits for the actuating mechanism are automatically interrupted at the end of each step, thereby preventing another step from being taken until the proper conditions are fulfilled. Previously known automatic accelerating systems depended upon the operation of the limit relay to control the operation of the sequence drum, however, it has been found that, frequently, the sequence drum would advance more than one step at a time because of the sluggish operation of the limit relay. The present invention makes it impossible for the sequence drum to advance more than one step at a time, thereby affording greater protection to the motors and also insuring that the sequence drums which may be utilized to control the operation of multiple-unit cars will be kept in synchronism, since all of the sequence drums in a multiple-unit train will be advanced one notch at a time.

In the event that it is desired to return the controller drum 10 to position 1, the master controller 71 may be actuated to the "off" position, thereby deenergizing the actuating coil 38 of the magnet valve 37 and also the coil of the magnet 25 which permits the spring 29 to disengage the pawl 23 from the rack 13. The magnet valve 37 is of a type which will admit the pressure fluid into the cylinder 36 to actuate the piston 35 and the rack 13 when the coil 38 is deenergized, thereby quickly returning the drum 10 to position 1.

However, it will be noted that a holding circuit is provided through the contact member 31, on the armature 24, for the coil 38 of the magnet valve 37 which prevents the coil 38 from being deenergized before the pawl 23 is disengaged from the rack 13, thereby precluding the possibility of the piston 35 attempting to actuate the rack 13 while it is engaged by the pawl 23.

From the foregoing description it is evident that I have provided a simple and efficient actuating mechanism for controllers which will produce a positive step-by-step movement of the controller drum.

Since numerous changes may be made in the above-described construction and different embodiments of the invention may be made without departing from the spirit and scope thereof, it is intended that all matter contained in the above description or shown in the accompanying drawings shall be interpreted as illustrative and not in a limiting sense.

I claim as my invention:

1. The combination with a controller drum and a rack and gear for rotating the drum, of an actuating mechanism for notching the drum step-by-step, said mechanism comprising a fluid actuated piston, a pawl carried by the piston, magnetic means for causing the pawl to engage the rack to actuate it step-by-step, and means actuated by the magnetic means for controlling the operation of the piston.

2. The combination with a controller drum and a rack and gear for rotating the drum, of an actuating mechanism for notching the drum step-by-step, said mechanism comprising a fluid-actuated piston, a pawl carried by the piston, an electro-magnet and a spring cooperating to cause the pawl to alternately engage and disengage the rack to actuate it step-by-step, and means actuated by the electromagnet for controlling the operation of the piston.

3. The combination with a controller drum and a rack and gear for rotating the drum, of an actuating mechanism for notching the drum step-by-step, said mechanism comprising a fluid-actuated piston, an electromagnet carried by the piston, a pivotally mounted armature actuated by the magnet, and a pawl actuated by said armature to engage the rack to actuate it step-by-step.

4. The combination with a controller drum and a rack and gear for rotating the drum, of an actuating mechanism for notching the drum step-by-step, said mechanism comprising a fluid-actuated piston, an electro-magnetically actuated valve for controlling the operation of the piston, an electro-magnet carried by the piston, a pivotally mounted armature actuated by the magnet, and a pawl actuated by said armature to engage the rack to actuate it step-by-step.

5. The combination with a controller drum and a rack and gear for rotating the drum, of an actuating mechanism for notching the drum step-by-step, said mechanism comprising a fluid-actuated piston, an electro-magnetically actuated valve for controlling the operation of the piston, an electro-magnet carried by the piston, a pivotally mounted armature actuated by the magnet, a pawl actuated by said armature to engage the rack to actuate it step-by-step, and switching means actuated by said armature to control the energization of said electro-magnetically actuated valve.

6. The combination with a controller drum and a rack and gear for rotating the drum, of an actuating mechanism for notching the drum step-by-step, said mechanism comprising a fluid-actuated piston, an electro-magnetically actuated valve for controlling the operation of the piston, an electro-magnet carried by the piston, a pivotally mounted armature actuated by the magnet, a pawl actuated by said armature to engage the rack to actuate it step-by-step, switching means actuated by said armature to control the energization of said electro-magnetically actuated valve, said switching means being disposed to prevent the operation of the piston by fluid pressure except when the pawl engages the rack.

7. The combination with a controller drum and a rack and gear for rotating the drum, of an actuating mechanism for notching the drum step-by-step, said mechanism comprising a fluid-actuated piston, an electro-magnetically actuated valve for controlling the operation of the piston, and switching means actuated by the piston to control the energization of the electro-magnetically actuated valve to cause the piston to repeat its stroke.

8. The combination with a controller drum and a rack and gear for rotating the drum, of an actuating mechanism for notching the drum step-by-step, said mechanism comprising a fluid-actuated piston, an electro-magnetically actuated valve for controlling the operation of the piston, switching means for controlling the energization of said valve, and means carrier by said piston for actuating said switching means to cause the piston to repeat its stroke.

9. In control apparatus, in combination, a controller drum, a rack and gear for rotating the drum, an actuating mechanism comprising a fluid-actuated piston and means carried by the piston for engaging the rack to actuate the drum step-by-step in one direction, and means for actuating the drum rapidly in the opposite direction.

10. In control apparatus, in combination, a controller drum, a rack and gear for rotating the drum, an actuating mechanism comprising a fluid-actuated piston and means carried by the piston for engaging the rack to actuate the drum step-by-step in one direction, and fluid operated means for actuating the drum rapidly in the opposite direction.

11. In control apparatus, in combination, a controller drum, a rack and gear for rotating the drum, an actuating mechanism comprising an electrically-controlled fluid-actuated piston and means carried by the piston for engaging the rack to actuate the drum step-by-step in one direction, and electrically-controlled fluid-operated means for actuating the drum rapidly in the oposite direction.

12. In control apparatus, in combination, a controller drum, a rack and gear for rotating the drum, an actuating mechanism comprising an electrically-controlled fluid-actuated piston and means carried by the piston for engaging the rack to actuate the drum step-by-step in one direction, electrically-controlled fluid-operated means for actuating the drum rapidly in the opposite direction, and interlocking means for preventing both of said actuating means from operating at the same time.

LYNN G. RILEY.